Figure 1:
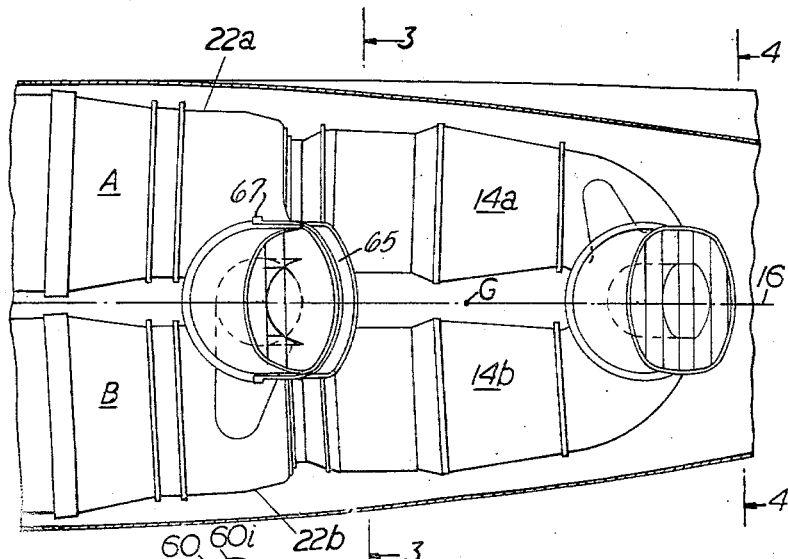

United States Patent Office 3,216,675
Patented Nov. 9, 1965

1

3,216,675
AIRCRAFT PROPULSION POWER PLANTS
Leonard Stanley Snell, Bristol, England, assignor to Bristol Siddeley Engines Limited, Bristol, England, a British company
Filed Dec. 26, 1963, Ser. No. 333,580
Claims priority, application Great Britain, Feb. 28, 1963, 8,184/63
4 Claims. (Cl. 244—23)

The invention relates to power plants for the propulsion of aircraft having short, or vertical, take-off and landing capability, comprising at least two independently operable turbojet engines both provided with means for discharging their jet efflux either rearwards or downwards, and is concerned with the problem of avoiding the introduction of large turning moments on the aircraft when an engine is shut down or becomes inoperative, the other engine or engines continuing to function.

According to the invention a power plant for the purpose described comprises two turbojet engines each including a compressor section and a turbine section coaxially arranged, the engines being disposed close together, with their axes extending substantially fore and aft, and with their lengths overlapping, a housing surrounding the engines and having an outer surface which, during horizontal flight, will be swept by relative airflow substantially in the fore and aft direction, a front and a rear pair of jet propulsion nozzles, each pair penetrating the housing outer surface symmetrically on opposite sides of a longitudinal plane which will be vertical during take-off and landing, each nozzle being adjustable to turn an efflux therethrough between rearward and downward directions, with rotation of the equivalent thrust vector of the efflux about a rotation axis, means connecting the compressor section of one engine to each front nozzle and the compressor section of the other engine to each front nozzle, and means connecting the turbine section of one engine to each rear nozzle and the turbine section of the other engine to each rear nozzle.

One form of power plant according to the invention comprises two engines superimposed one above the other and four swivelling nozzles each having two separate flow passages, each engine being connected to supply air from its compressor section to one of the flow passages of each of a pair of nozzles on opposite sides of the plane of symmetry, and exhaust gas from its turbine section to one of the flow passages of each of the other pair of nozzles.

Arrangements of this kind make it possible, irrespective of whether one or both engines are operating, for the resultant of the thrusts from the nozzles to lie always in, or at least near to, the plane of symmetry.

The invention is of particular interest for the case of a twin-engined winged aircraft in which part of the fuselage main body constitutes the housing surrounding the engines, since the introduction of large turning moments on the aircraft when an engine is shut down or loses power is directly avoided by the arrangement of the jet propulsion nozzles.

The invention is however also of interest in connection with winged aircraft comprising a plurality of pairs of engines housed in pods penetrated by the nozzles. In this case the resultant thrust from each pod always acts on the aircraft with substantially the same lever arm, which simplifies the provision of means for automatically compensating for reduction or loss of thrust from one engine.

It will be appreciated that during vertical take-off and landing, and transition to or from horizontal flight, unintentional reduction or loss of thrust from one engine requires immediate compensation to avoid catastrophic loss of control of the aircraft. This can be accomplished automatically if the engines have sufficient short period overload capacity, the system including for example a thrust measuring device for each engine of a pair, associated with thrust control means for each engine for maintaining the total thrust in accordance with the setting of a thrust selector controlled by the pilot. Such an arrangement, used in an aircraft having either a twin engine power plant or twin pods each with paired engines according to the present invention, would provide useful additional safety during take-off, transition and landing. In the case of a twin pod aircraft for short take-off and landing, or in which the full safety feature is not demanded during vertical take-off and landing, the compensating system can however operate at least partially by reducing the thrust of one pod to offset a turning moment caused by unintentional reduction of thrust from the other pod, thus reducing the overload which one engine is required to carry.

Furthermore, even in cases in which danger due to loss of thrust of an engine during vertical take-off and transition to wingborne flight is not wholly eliminated, the invention enables a twin or multi-engined aircraft to be cruised at a reduced speed by shutting down one or more engines, without thereby introducing serious out of balance thrust forces, and also enables such an aircraft to be flown back to its base after failure of one engine during normal wingborne flight.

Figure 2:
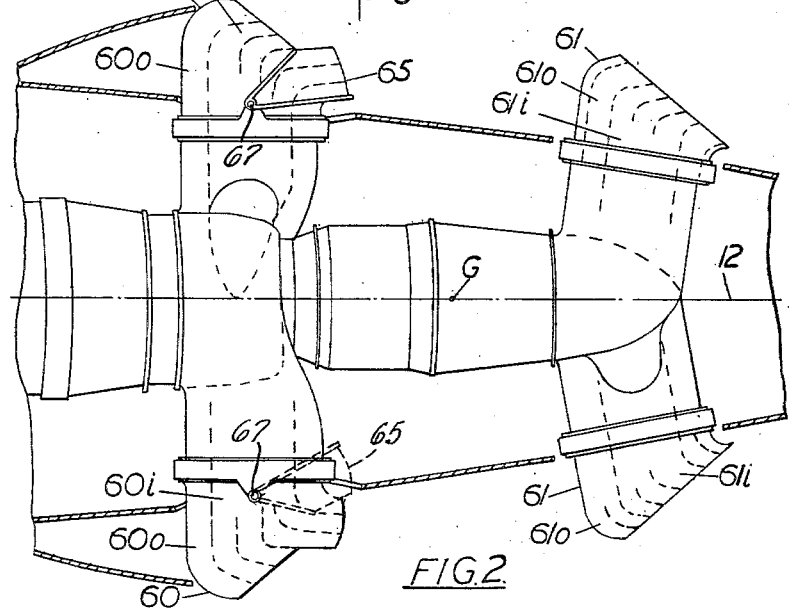
Figure 3:
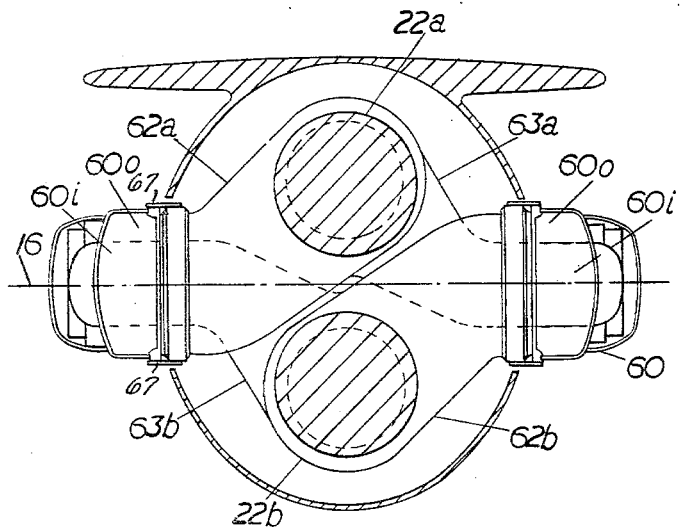
Figure 4:
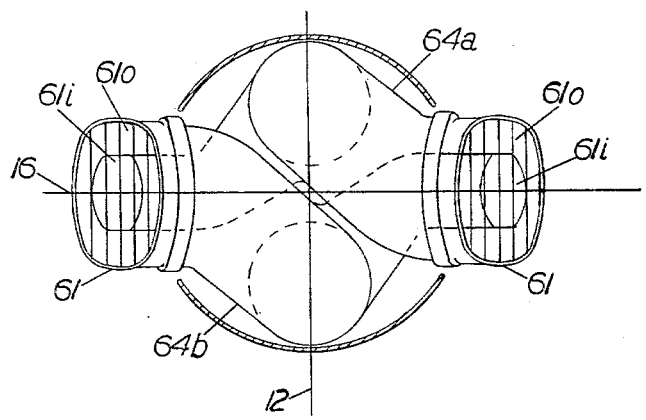
Figure 5:
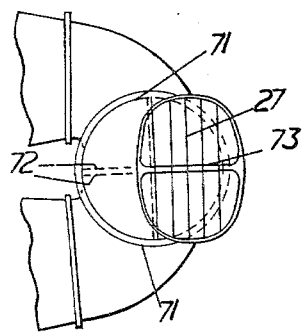
Figure 6:
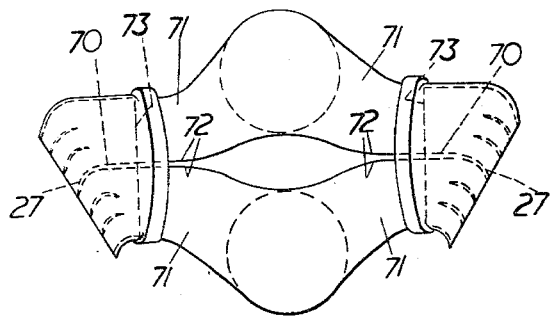

The invention is illustrated by the accompanying drawings, in which:

FIGURES 1 and 2 show in elevation and plan respectively one arrangement of two engines;

FIGURES 3 and 4 are transverse sections corresponding to the lines 3—3 and 4—4 in FIGURE 1; and FIGURES 5 and 6 are fragmentary side and end views of a modified nozzle arrrangement, in different positions.

In the form of power plant shown in FIGURES 1 to 4 the two engines A and B are superimposed one above the other. The front and rear nozzles 60 and 61 are each of the swivelling pipe-bend type and are constructed with inner and outer concentric flow passages. All the nozzles are arranged in a plane 16 which is horizontal during normal wingborne flight, and which preferably passes through the centre of gravity G of the aircraft and the effective centre of area of the engine air intake openings (not shown).

The port and starboard front nozzles have outer flow passages 60o which are connected by slanting ducts 62a and 62b respectively to receive air from the plenum chambers 22a and 22b of the engines A and B respectively, while their inner flow passages 60i are connected by oppositely slanting ducts 63b and 63a to receive air from the plenum chambers 22b and 22a of the engines B and A respectively. In other words, each plenum chamber is connected to supply air to one nozzle outer flow passage and one nozzle inner flow passage on opposite sides of the power plant.

Similarly, the port and starboard rear nozzles have outer flow passages 61a which are connected by slanting ducts 64b and 64a respectively to receive exhaust gas from the turbine sections 14b and 14a of the engines B and A respectively, and inner flow passages 61i which are connected by slanting ducts 64a and 64b respectively to receive exhaust gas from the engines A and B respectively. With this arrangement both engines are identical in respect of the layout of the ducting to the nozzles, and thrust is produced at all four nozzles irrespective of whether one or both engines are operating. Preferably the inner and outer flow passages of each nozzle are designed to produce the same thrust, so that the pattern of thrust distribution remains the same for single and twin engine operation.

The air supplied to the front nozzles may be heated by combustion of fuel in the respective plenum chambers 22a and 22b. In this case, the front nozzles may be provided with visors 65 to control the outlet areas of the nozzles. These visors are pivoted at 67, and can be swung between an outer position (shown in the upper part of FIGURE 2) in which they block part of the outlet, at the same time permitting the inner and outer passages, and an inner position (shown in chain lines in the lower part of FIGURE 2) in which they are clear of the nozzle. The nozzle outlet end is shaped to match the visor.

As illustrated by FIGURES 5 and 6, showing rear nozzles, instead of the nozzles having inner and outer concentric flow passages they may have a diametral partition 70 which is an upstream continuation of a central deflector vane 27. In this case the exhaust gas supply ducts (and similarly the air ducts in the case of the front nozzles) terminate adjacent the nozzle stem portions in semi-circular section portions 71 arranged with their flat sides 72 contiguous. The flat sides are preferably arranged horizontally so as to be aligned with the partitions 70 of the nozzles when the latter are in their downwardly directed positions as shown in FIGURE 6. As the nozzles are turned from this position, losses could occur during single engine operation due to working fluid from the engine which is operating entering both passages of the nozzle. These losses can be reduced by providing additional angularly spaced diametral partitions in the nozzles, one such additional partition 73 being sufficient to eliminate the losses in the forward thrust setting of the nozzles as shown in FIGURE 5.

I claim:
1. An aircraft power plant comprising two turbojet engines, each including a compressor section and a turbine section coaxially arranged, the engines being disposed close together, with their axes extending substantially fore and aft, and with their lengths at least partly overlapping, a common housing closely surrounding the engines and having an outer surface which, during forward flight, will be swept by relative airflow substantially in the fore and aft direction, a front and a rear pair of jet propulsion nozzles, each pair penetrating the housing outer surface with the propulsion nozzles of each pair having each a respective discharge outlet adjacent to the housing outer surface on opposite sides of a plane through the housing which will be vertical and fore and aft during take-off and forward flight, each nozzle having first and second separate flow passages, first means connecting the compressor section of one of the engines to the first flow passage of each front nozzle and the compressor section of the other of the engines to the second flow passage of each front nozzle, and means connecting the turbine section of one engine to the first flow passage of each rear nozzle and the turbine section of the other engine to the second flow passage of each rear nozzle.

2. A power plant according to claim 1 wherein the two flow passages in each nozzle are concentric.

3. A power plant according to claim 1 wherein the two flow passages in each nozzle are side-by-side.

4. A power plant according to claim 3 wherein each nozzle includes at least two angularly spaced diametral partitions.

References Cited by the Examiner
UNITED STATES PATENTS 3,075,725  1/63  Dornier _____ 244—12

FOREIGN PATENTS 226,135  12/59  Australia.
861,480  2/61  Great Britain.
1,222,439  1/60  France.

MILTON BUCHLER, *Primary Examiner.*

FERGUS S. MIDDLETON, *Examiner.*